April 15, 1952 — C. E. CUSHMAN — 2,592,868
CABLE TENSION INDICATOR
Filed July 16, 1946 — 2 SHEETS—SHEET 1

INVENTOR.
CLIFFORD E. CUSHMAN
BY
ATTORNEY.

April 15, 1952     C. E. CUSHMAN     2,592,868
CABLE TENSION INDICATOR
Filed July 16, 1946     2 SHEETS—SHEET 2
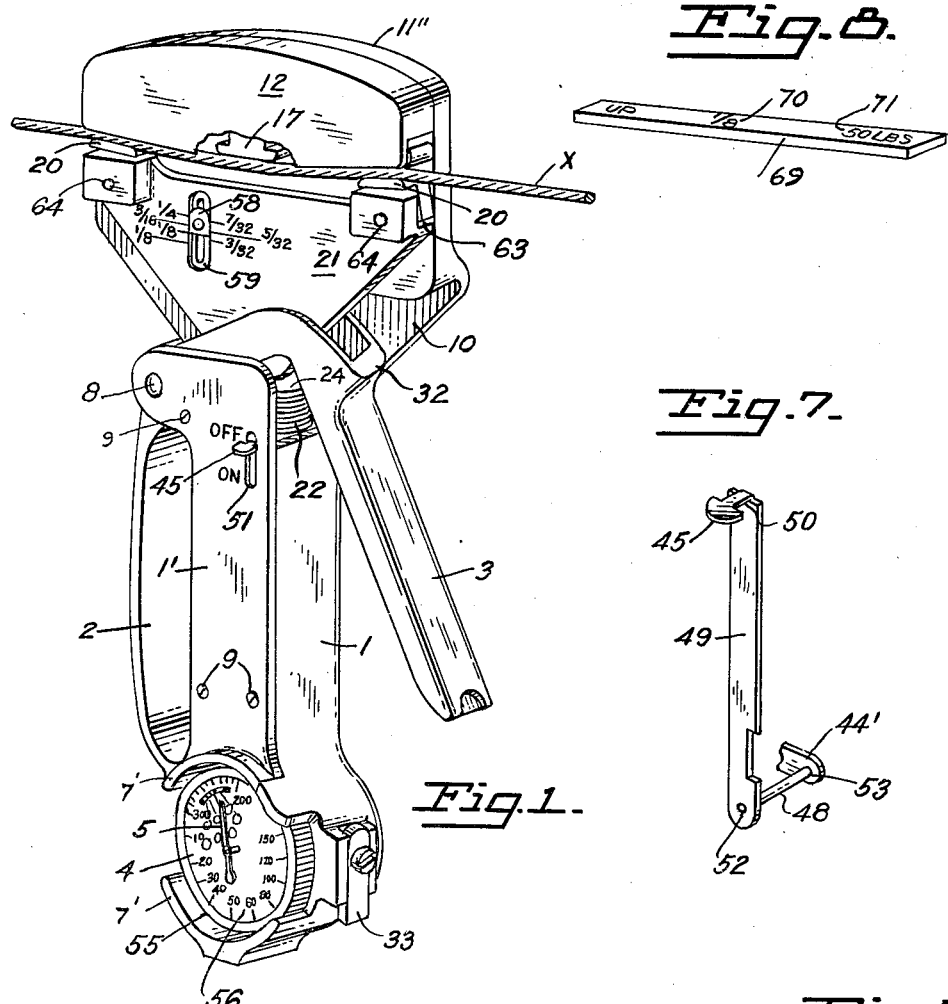
INVENTOR.
CLIFFORD E. CUSHMAN
BY
ATTORNEY Patented Apr. 15, 1952

2,592,868

UNITED STATES PATENT OFFICE 2,592,868

CABLE TENSION INDICATOR

Clifford E. Cushman, Burbank, Calif., assignor to Sturgess, Inc., Glendale, Calif., a corporation of California Application July 16, 1946, Serial No. 683,823

20 Claims. (Cl. 73—144)

This invention relates to small portable instruments for manually applying to tensioned cables, wires, or ropes, for indicating the tension existing in the cable etc., and is particularly useful in connection with checking the tension in the various control cables of air craft.

The principal object of the present invention is to effect improvements in such a cable tension indicator so that it will be easier and quicker to operate, and may be "set" for various size cables in a moment's time without removing or substituting for others, any of its parts.

One of the features is a construction which will give a direct reading in pounds, of the tension existing in any of several different sizes of cables.

Other features are accuracy, compactness, and a sturdy construction not easily damaged.

Still other advantages and constructional features will appear in the following description and accompanying drawings.

In the drawings—

Fig. 1 is a perspective view of my improved cable tension indicator showing the front, top, and hand lever side, and with the instrument gripping a cable to be tested.

Fig. 4 is an enlarged fragmentary vertical cross section taken along the line 4—4 of Fig. 2.

Fig. 5 is an enlarged fragmentary vertical cross section along the line 5—5 of Fig. 2.

Fig. 6 is an enlarged fragmentary vertical cross section along the line 6—6 of Fig. 2.

Fig. 7 is a detached perspective view of the dial locking rod and toggle.

Fig. 8 is a perspective view of a special spring test bar for checking the accuracy of the instrument.

Figure 2:
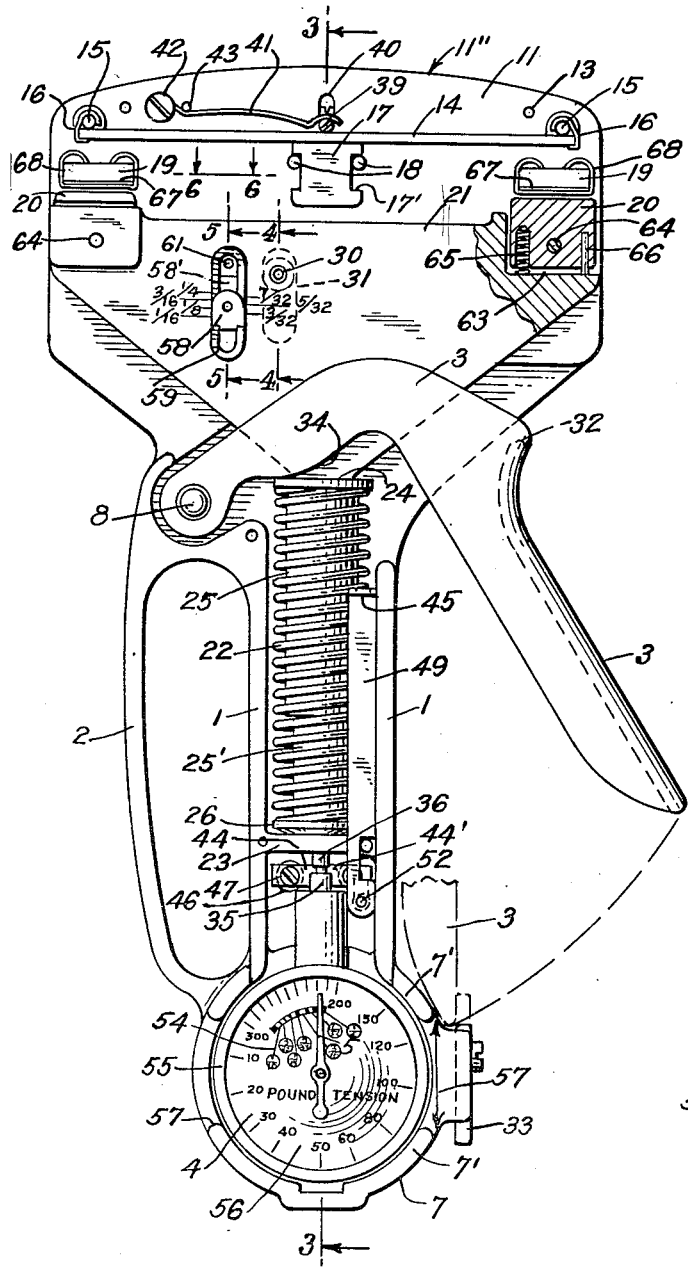
Fig. 2 is a full size front elevation of the instrument with the forward cover plate of the housing removed and some portions broken away to reveal the structure within.

In more detail the instrument comprises a hollow casing taking the form of a hollow column 1 adapted for grasping in one hand and provided with a rigid finger guard loop 2 at one side adapted to overlie the fingers of the holding hand, and at the opposite side is a pivoted hand lever 3 normally extending downwardly and outwardly in a manner adapted to come into position in the palm of the grasping hand just under the thumb so that by a squeezing action of the hand the lever 3 may be forced from the position shown in Fig. 2, down substantially against column 1 as shown in dotted lines where it may be locked down as by a slidable latch shown at 33.

At the lower end of the column 1 and facing the front side of the instrument is an indicator dial 4 provided with a movable hand or pointer 5 of a conventional movement indicator mechanism the enclosing body 6 of which is housed within the lower rounded end 7 of the column or casing 1.

The hand lever is pivoted on an axle 8 the ends of which are supported in the body of the instrument above the finger guard 2 and in the cover plate or forward wall 1' of the column, and which is preferably detachable and is normally held in place as by screws 9.

The rearward wall 10 of the column is extended upward above the forward and side walls and then extended forwardly as at 10' and then vertically again as at 11 where it is preferably thicker or ribbed as at 11' to stiffen it, and it is also widened out to form with the column 1 substantially the shape of the letter Y with the upper legs joined as a solid plate constituting the upper end of the rear wall (11).

The extreme upper edge of body plate 11 is preferably arched from end to end as indicated at 11'' and against the front side is a similarly arched cover plate or cap 12 secured in place as by rear screws 13, and which cap serves to cover a relatively long straight leaf spring 14 which is suspended at its ends against the undersides of two studs 15 projecting rigidly forward from rear plate 11.

The ends of the leaf spring 14 are held snugly in place against the studs as by small spring steel clips 16 which engage around the ends of the spring and overlie the studs. Under the leaf spring 14, centrally disposed is a cable fulcrum block 17.

Fulcrum block 17 is rectangular and has a substantially flat upper end in contact with the under side of the spring and has a substantially flat lower end with corners slightly rounded and against which lower end the cable to be tested bears. The fulcrum block is vertically slidably suspended against the smooth forward side of cover plate 11 and guided for vertical movement by means of two pins 18 projecting forward out of plate 11 and positioned respectively in recesses 17' in the sides of the block forming upper and lower shoulders to limit the total vertical movement of the block. When the spring is relaxed to straight position shown in Fig. 2 the block 17 is suspended by the upper ends of recesses 17' coming against the pins 18 and with its upper end just in contact with the under side of the spring.

Just under the opposite ends of leaf spring 14 is a pair of spaced rigid lugs 19 which project forwardly from plate 11 under the leaf spring to provide fixed stops against which the cable to be tested for tension is forced by a pair of spaced clamping blocks 20 carried on the upper corners of a vertically movable triangular pressure plate or bracket 21 which lies against rear wall 11 and is resiliently urged upward by a heavy coiled compression spring 22 positioned within the hollow housing column 1 to react at its lower end against a transverse ledge 23 of the column and at its upper end against a collar 24 in contact with the lower end of movable plate 21.

Preferably spring 22 is loosely mounted around the outer of a pair of freely telescopic tubes 25 and 25' to guide its movement, the lower tube section 25' being reduced and formed with a shoulder seated against a collar 26 at its lower end against the upper side of which the spring seats and which collar is rounded at its under side for rocking support on the ledge 23. The upper end of the upper tube section 25 is also reduced and formed with a shoulder seating against the under side of upper collar 24 and further formed with an upwardly extending neck 28 which extends into a socket 29 formed on the lower end of the triangular bracket plate 21 and is secured thereto either by a set screw as indicated at 29' or otherwise so as to virtually make the upper tube section an integral portion of the vertically movable bracket 21.

Bracket 21 is further guided for vertical movement by a stud or shoulder screw 30 screwed into the bracket from the back through a vertical slot 31 formed in the rear fixed wall 11 of the housing, so that normally compression spring 22 will urge the bracket 21 upward or rather straight outward toward block 17 to bring the two spaced blocks 20 toward fixed projecting lugs 19, so that a cable (as at X in Fig. 1) extending through the instrument will pass under central block 17, over both end blocks 20 and be forced against lugs 19 by spring 22 when the lever 3 is released, and the cable will be deflected between blocks 20 by the force of flat spring 14 an amount determined by the tension in the cable, and with concomitant outward deflection of flat spring 14 against the underside of which the central or intermediate block 17 bears.

In order to retract bracket 21 and its two blocks 20 against the force of spring 22, lever 3 which is pivoted at 8 to the frame or housing of the instrument, is pressed downward and inward against the column 1 by the hand holding the instrument. The lever is bifurcated from the pivoted end to the point 32 to straddle the bracket and each side is formed with a heel 34 bearing against the upper surface of washer 24 so as to positively force bracket 21 downward against the spring 22 as the handle is moved downwardly from the position of Fig. 2, to the dotted line position.

Figure 3:
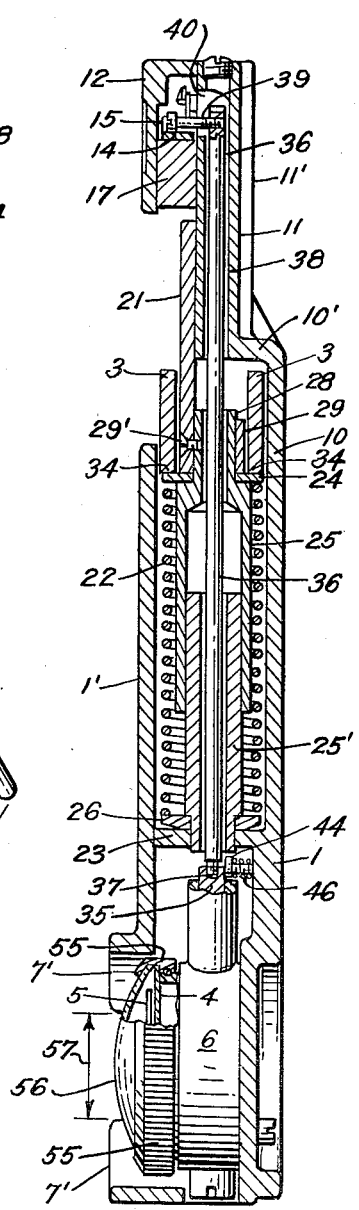
Fig. 3 is a vertical cross section of Fig. 2 taken along the line 3—3 of Fig. 2.

To measure the deflection of the leaf spring 14 and therefore the deflection of the cable, it suffices to connect the usual plunger 35 of the indicator 6 with a stiff wire or rod 36, either by simple contact or by screwing it thereto as indicated at 37 in Fig. 3 and which rod 36 passes straight through the telescopic tubes 25', 25, neck 28, and a free vertical passageway 38 in rear wall 11 almost to the top of the instrument and where it is fitted with a forwardly extending pin or small screw 39 which projects out of a small vertical slot 40 in plate 11 just above the flat spring 14 and which pin or screw projects over the flat spring and is resiliently urged downwardly against the flat spring as by a very light wire spring 41 secured and positioned against plate 11 as by a screw 42 and fulcrum pin 43, all so that as the block 17 rises with spring 14 when a tensioned cable is forced against the lower end of the block, the rod 36 will rise and also permit the indicator plunger 35 to rise, and through the usual indicator mechanism of indicator 6 to swing the indicator needle 5 to the appropriate dial figure, and conversely the needle will be retracted by the indicator mechanism when the pressure of the cable against block 17 is released, tho a friction brake is provided to hold the needle at the reading after releasing the cable if desired.

This brake comprises a spring pressed plate 44 which engages the rear side of plunger 35 of the indicator and to hold it at any point of travel, and which plate or brake may be released or applied by means of a finger piece 45 at the outer side of cover plate 1'. (See Fig. 1.)

In further detail this finger controlled indicator brake includes one or more small coil springs 46 under the brake plate 44 forcing it toward the indicator plunger 35, loosely anchoring one end of the plate to the wall of the instrument as by a screw 47 to act as a fulcrum, extending the other end (44') of the plate to form an operating lever, and forcing this end rearward to compress the spring 46 and release the brake, by means of a toggle pin 48 which extends rockably between 44' and a flat slidable link or brake rod 49 which is slidably positioned just under the cover plate 1' and connects with finger piece 45 by a neck 50 extending through a short slot 51 in the cover plate (see Figs. 1 and 7) so that by a slight movement of the thumb of the hand holding the instrument the brake rod 49 may be slid to "on" or "off" position designated on the cover plate 1'. As the toggle pin 48 is pivotally or rockably engaged at opposite ends in sockets 52, 53 formed in members 49 and 44' and the toggle pin is longer than the perpendicular distance between these members, it will be seen that upon sliding the rod 49 to move the pin 48 into perpendicular relation to plate 44 and rod 49 it will depress plate 44 against spring 46 and release its grip on indicator plunger 35 so it is free to move.

As the instrument is used to test the tension in various size cables, for aircraft the sizes generally being from $\frac{1}{16}$ inch diameter up to $\frac{1}{4}$ inch diameter, the figures of the dial are calibrated to express the tension of the cable being tested in pounds, and the dial and needle are arranged for relative presetting to a particular point for each size of cable, as $\frac{1}{16}$, $\frac{3}{32}$, $\frac{1}{8}$, $\frac{5}{32}$, $\frac{3}{16}$, $\frac{7}{32}$, and $\frac{1}{4}$ inch, by special zero lines 54 shown on the drawing, and which zero lines may be selectively registered with the needle by turning the rim 55 of the dial to which both the glass cover 56 and dial card 4 are secured to revolve as a unit independent of the needle.

Rim 55 revolves under a nice friction fit, or any suitable frictional construction, so that it will stay in any adjusted position, and the rim is protected against accidental contact with adjacent things by the provision of an outer higher rim 1' formed on the instrument body or casing which surrounds the indicator and is notched out at opposite sides only as at 57 to make the dial rim 55 accessible for turning.

By this means but one set of dial figures is required, to directly read the tension in pounds for any size cable to which the instrument is applied, tho of course the instrument may be made for any special size cable only, and to include very large cables as may be desired.

The instrument also provides means for automatically measuring each cable, rope, or wire, to which it is applied and indicate its diameter, so that the cable will not have to be separately calibrated in setting the dial as described. This is carried out by a vertically slidable gage plate 58 (see Figs. 1, 2, 5 and 6) which slides in a slotted recess 59 depressed in the face of bracket 21 and the lower straight edge of which gage plate reads against the cable size scale marks and sizes ($\frac{1}{16}''$ to $\frac{1}{4}''$) engraved in plate 21 on both sides of the depression 59 as shown in Figs. 1 and 2.

The gage plate 58 is of thin spring metal doubled backward at its lower end to extend upward in a depression in the rear side of plate 21 and with the two portions connected at the lower end. The upper end of this rear extension is designated 58' in Figs. 2 and 5 and extends adjacent the outer face of plate 11 where it strikes a small pin 61 (Fig. 6) as the instrument is closed on a cable and thereby shifts the gage plate downward until it reads at a figure corresponding to the diameter of the cable (or distance between blocks 20 and lugs 19 when the cable is gripped between them). Gage plate 58 must be manually slid upward to the top of its guiding slot before applying the instrument to a cable and it will be automatically pushed down each time and frictionally stay in place to give the diameter of the cable, and to which the indicator dial rim 55 is of course set. Once set, the dial remains correct for that size cable without paying any attention to either the gauge or the dial.

A detail of importance is the special form and mounting of the spaced cable clamping blocks 20 on the movable bracket 21. The blocks have flat upper surfaces against which the cable seats and have rounded corners; similar to the under side of the central fulcrum block 17; and the blocks are each positioned in a pocket 63 formed on bracket 21 and mounted for slight rocking movement on a pin 64 but normally urged by a small spring 65 at the inner end of the block to rock to a position parallel with the underside of lug 19 above it, and as prescribed by a small stop pin 66 which projects from the lower side of the outer end of the blocks (as shown at the right-hand upper corner of Fig. 2). Thus the clamping blocks are free to tip inward slightly as the cable is deflected, but are always returned to their original position by springs 65 when first applied to a cable.

Fixed lugs 19 are preferably supplied with two or three very thin shims 67 held in place by spring clips 68 which overlap the ends of the lug and urge the shims up tightly against the under sides of the lugs. The use of shims offers a ready means of adjusting the reading on the dial to exactly correspond with known tension in a test cable, or deflectible spring test bar of known value (Fig. 8).

The bar 69 is of a thickness equal to the cable size marked on it at 70 and should give a dial reading equal to the pounds marked on it at 71 when the dial is set for that size cable, or the instrument adjusted.

In using the instrument, it is gripped in the hand with the fingers projecting under the guard 2 and the lever 3 under the ball of the thumb and squeezed or pressed down to bring the lever against the column 1, to retract blocks 20 so that the instrument may easily be applied over a straight run or bight of cable as it is entirely open on the front side to permit this, and after which the handle is released by relaxing the pressure of the holding hand to permit the cable to be clamped and deflected, and the tension existing in the cable will be indicated in pounds on the dial of the indicator. If desired the dial hand may be locked by moving the finger piece 45 downward with the thumb, and after which the instrument may be released from the cable, the hand lever 3 locked down by sliding latch 33 upward, and the dial reading observed in better light or to better advantage, if the cable tested were in some awkward position or dark place.

The use of the automatic cable calibrating feature and dial presetting features have previously been explained.

Having thus described my improved cable tension indicator, and the manner of its operation and use, what I claim is:

1. A cable tension indicator comprising a frame of substantially Y form with the lower leg of hollow construction of a size forming a column for grasping in one hand, a coiled spring housed longitudinally within said column, a bracket slidably guided against the upper portion of said frame subjected to the force of said spring for sliding the bracket upward, hand lever means adapted to be operated by the hand holding said column for moving said bracket against the action of said coiled spring, a pair of cable supporting blocks spacedly carried by said bracket adjacent the outer upper corners of the frame, an intermediate cable supporting block carried by the frame between the spaced blocks, whereby a tensioned cable may be gripped between the spaced blocks at one side of the cable and the intermediate block at the opposite side, and means for indicating the tension in a cable when so gripped.

2. A cable tension indicator comprising a frame of substantially Y form with the lower leg of hollow construction of a size forming a column for grasping in one hand, a coiled spring housed longitudinally within said column, a bracket slidably guided against the upper portion of said frame subjected to the force of said spring for sliding the bracket upward, hand lever means adapted to be operated by the hand holding said column for moving said bracket against the action of said coiled spring, a pair of cable supporting blocks spacedly carried by said bracket adjacent the outer upper corners of the frame, an intermediate cable supporting block carried by the frame between the spaced blocks, whereby a tensioned cable may be gripped between the spaced blocks at one side of the cable and the intermediate block at the opposite side, and means for indicating the tension in a cable when so gripped comprising a leaf spring against which said intermediate block bears and is adapted to be deflected by the gripped cable, a motion indicator mounted on said frame, and means transmitting the movement of said intermediate block to said indicator for indicating its movement thereon.

3. A cable tension indicator comprising a frame of substantially Y form with the lower leg of hollow construction of a size forming a column for grasping in one hand, a coiled spring housed longitudinally within said column, a bracket slidably guided against the upper portion of said frame subjected to the force of said spring for sliding the bracket upward, hand lever means adapted to be operated by the hand holding said column for moving said bracket against the action of said coiled spring, a pair of cable supporting blocks spacedly carried by said bracket adjacent the outer upper corners of the frame, an intermediate cable supporting block carried by the frame between the spaced blocks, whereby a tensioned cable may be gripped between the spaced blocks at one side of the cable and the intermediate block at the opposite side, and means for indicating the tension in a cable when so gripped comprising a leaf spring against which said intermediate block bears and is adapted to be deflected by the gripped cable, a motion indicator mounted on said frame, and means transmitting the movement of said intermediate block to said indicator for indicating its movement thereon, said indicator provided with a reading scale graduated in terms of the cable tension expressed in pounds.

4. In a structure as set out in claim 2 said indicator provided with an indicating pointer and a reading scale graduated in terms of the cable tension in pounds, and means for adjusting the relative position of said scale as a whole to said pointer to read correctly in pounds pull in the cable for various particular size cables.

5. In a structure as set out in claim 2 said indicator provided with a movable indicating pointer and a reading scale graduated in terms of the cable tension in pounds, and means for adjusting the relative position of said scale as a whole to said pointer to read correctly in pounds pull in the cable for various particular size cables comprising a rim manually revolvable about the indicator, a graduated numerical dial and a transparent cover thereover arranged to revolve as a unit with said rim independently of the pointer of the indicator, and a plurality of separate zero marks on said dial designated for various size cables, and selectively with which the pointer at rest may be set by turning said rim.

6. In a structure as set out in claim 2 said indicator provided with a movable indicating pointer and a reading scale graduated in terms of the cable tension in pounds, and means for adjusting the relative position of said scale as a whole to said pointer to read correctly in pounds pull in the cable for various particular size cables comprising a rim manually revolvable about the indicator, a graduated numerical dial and a transparent cover thereover arranged to revolve as a unit with said rim independently of the pointer of the indicator, and a plurality of separate zero marks on said dial designated for various size cables, and selectively with which the pointer at rest may be set by turning said rim, and a guard rim on said frame protecting said rim from being turned except from a special place provided.

7. In a structure as set out in claim 2 said indicator housed in the lower end of said column, and the means transmitting the motion of the intermediate block comprising a slidable rod extending from adjacent said intermediate block through the hollow center of said coiled spring and connecting said block and an actuating part of said indicator for simultaneous motion.

8. In a structure as set out in claim 1 the slidably guided bracket being substantially triangular conforming to the upper portion of the Y frame and the spaced cable supporting blocks pivotally mounted each for limited motion respectively on the two upper corners of said bracket.

9. In a structure as set out in claim 1 the slidably guided bracket being substantially triangular conforming to the upper portion of the Y frame and the spaced cable supporting blocks rockably mounted each for limited motion respectively on the two upper corners of said bracket, and spring means reacting against said bracket tending to rock both blocks to a definite starting point.

10. In a structure as set out in claim 1, a pair of fixed stops projecting laterally from said frame cooperating with said spaced blocks for clamping the cable at opposite sides at spaced points from the intermediate block.

11. In a structure as set out in claim 2 said hand lever means being a lever pivoted at one end to said frame for swinging parallel to the plane of the frame and provided with a bifurcated portion straddling the slidably guided bracket and further provided with a handle portion normally extending angularly with respect to said column and adapted to be forced toward and substantially against said column by squeezing action of the hand holding the column and handle.

12. In a structure as set out in claim 2 said indicator housed in the lower end of said column, and the means transmitting the motion of the intermediate block comprising a slidable rod extending from adjacent said intermediate block through the hollow center of the coiled spring and connecting at its lower end with an actuating part of said indicator, said rod provided adjacent its upper end with a laterally projecting pin overlying said leaf spring to transmit the motion of the block and said spring to said rod, and separate spring means arranged to gently urge said pin toward said leaf spring.

13. In a structure as set out in claim 2, brake operating means positioned on the upper portion of said column in position for operating by the thumb of the hand holding said column for locking and unlocking the indicator in recording position.

14. In a structure as set out in claim 2 a protective cap extending along the upper end of the Y frame overlying said leaf spring and intermediate cable supporting block to provide against fouling the cable in applying the instrument to a cable.

15. In a structure as set out in claim 1, a pair of fixed stops projecting laterally from said frame cooperating with said spaced blocks for clamping the cable at opposite sides at spaced points from the intermediate block, and means for varying the working face of at least one of said fixed stops relative to its cooperating block.

16. In a structure as set out in claim 2, a pair of spaced fixed fulcrums carried by said frame against which the ends of said flat spring are fulcrumed, and means resiliently holding said flat spring in contact with said fulcrums.

17. In a cable tension indicator of the character described, two relatively movable parts, a spring carried by the first of said parts with a fulcrum in contact with said spring and arranged to bear against a cable bight, a pair of spaced blocks carried by the second of said parts arranged to impinge the cable at opposite sides of said fulcrum to deflect the cable and said spring, and a pair of spaced lugs carried by the first of said parts in confronting relation to said blocks and against which the cable is clamped by said blocks as the parts are moved relatively, and means for indicating the deflection of the spring.

18. In a cable tension indicator as set out in claim 17 there being means to move said two relatively movable parts comprising a superior spring of greater power than the fulcrum contacting spring to clamp the cable between said lugs and blocks, and hand lever means arranged for releasing said parts from clamping position against the force of said superior spring.

19. A cable tension indicating instrument comprising a pair of relatively movable members arranged for clamping between them the opposite sides of a bight of tensioned cable at longitudinally spaced points, means for deflecting the cable bight between said spaced points, a movement indicator indicating the deflection of the cable in terms of the tension existing in the cable, and cooperating relatively movable gauging elements carried respectively by said movable members arranged to indicate the movement of said members in clamping the cable in terms of the diameter of the cable so clamped.

20. In a deflecting cable tension indicating instrument of the character described, two relatively movable frame parts, means carried by said parts for impinging from opposite sides a cable being tested as the frame parts are operated, a movable slider on one of said parts adapted to indicate the diameters of various size cables so impinged, means on the other of said parts contacting said slider and moving it upon relative movement of said parts graduated to indicate the diameter of the cable being impinged, spring supported means deflected by the cable upon being impinged, a pressure indicator provided with a dial graduated with respect to such indicated cable diameter, and means for operating said indicator by the deflection of said cable through said spring supported means.

CLIFFORD E. CUSHMAN.

REFERENCES CITED

The following references are of record in the file of this patent:

UNITED STATES PATENTS

| Number | Name | Date |
|---|---|---|
| 1,380,251 | Riba | May 31, 1921 |
| 1,384,710 | Morell | July 12, 1921 |
| 1,572,353 | Godwin et al. | Feb. 9, 1926 |
| 1,771,339 | Martin | July 22, 1930 |
| 1,872,087 | Martin | Aug. 16, 1932 |
| 2,021,201 | Roos | Nov. 19, 1935 |
| 2,118,727 | Hanes | May 24, 1938 |
| 2,285,471 | Sturgess | June 9, 1942 |
| 2,350,419 | Sang | June 6, 1944 |
| 2,357,643 | Floyd | Sept. 5, 1944 |
| 2,363,347 | Mars | Nov. 21, 1944 |
| 2,372,434 | Krouse | Mar. 27, 1945 |
| 2,403,799 | Holton | July 9, 1946 |
| 2,471,999 | Boos | May 31, 1949 |

FOREIGN PATENTS

| Number | Country | Date |
|---|---|---|
| 199,152 | Great Britain | June 20, 1923 |
| 596,531 | France | Aug. 10, 1925 |